United States Patent
Minvielle-Larrousse

(10) Patent No.: US 9,495,747 B2
(45) Date of Patent: Nov. 15, 2016

(54) REGISTRATION OF SAR IMAGES BY MUTUAL INFORMATION

(71) Applicant: Commissariat a l'energie atomique et aux energies alternatives, Paris (FR)

(72) Inventor: Pierre Minvielle-Larrousse, Cestas (FR)

(73) Assignee: Commissariat a l'energie atomique et aux energies alternatives, Paris (FR)

(*) Notice: Subject to any disclaimer, the term of this patent is extended or adjusted under 35 U.S.C. 154(b) by 0 days.

(21) Appl. No.: 14/785,215

(22) PCT Filed: Apr. 23, 2014

(86) PCT No.: PCT/EP2014/058223
§ 371 (c)(1),
(2) Date: Oct. 16, 2015

(87) PCT Pub. No.: WO2014/173939
PCT Pub. Date: Oct. 30, 2014

(65) Prior Publication Data
US 2016/0098838 A1    Apr. 7, 2016

(30) Foreign Application Priority Data
Apr. 24, 2013  (FR) ...................... 13 53745

(51) Int. Cl.
*G06K 9/62* (2006.01)
*G06K 9/64* (2006.01)
*G06T 7/00* (2006.01)
(Continued)

(52) U.S. Cl.
CPC ......... *G06T 7/0034* (2013.01); *G06K 9/00214* (2013.01); *G06K 9/4647* (2013.01); *G06K 9/52* (2013.01); *G06K 9/6212* (2013.01); *G06T 7/0044* (2013.01); *G06T 7/0048* (2013.01); *G06T 7/403* (2013.01); *G06T 2207/10032* (2013.01); *G06T 2207/10044* (2013.01); *G06T 2207/20072* (2013.01); *G06T 2207/20076* (2013.01); *G06T 2207/20116* (2013.01)

(58) Field of Classification Search
None
See application file for complete search history.

(56) References Cited

U.S. PATENT DOCUMENTS

2008/0037869 A1* 2/2008 Zhou ................... G06T 7/0081
                                                      382/173
2008/0118135 A1* 5/2008 Averbuch ............. G06T 7/0012
                                                      382/131

(Continued)

OTHER PUBLICATIONS

Pluim, Josien PW, JB Antoine Maintz, and Max A. Viergever. "Mutual-information-based registration of medical images: a survey." IEEE transactions on medical imaging 22.8 (2003): 986-1004.*

(Continued)

*Primary Examiner* — Li Liu
(74) *Attorney, Agent, or Firm* — Oblon, McClelland, Maier & Neustadt, L.L.P.

(57) ABSTRACT

A method for registering an image using a similarity criterion based on mutual information. The image to be registered is compared with a plurality of reference representations of an object, each reference representation being of a plurality of homogeneous zones. The mutual information between the image to be registered and each reference representation is calculated, on the set of homogeneous zones. The registration is given by the reference representation corresponding to the highest mutual information. The method can be advantageously applied to an aircraft aided navigation by registering images obtained by a synthetic aperture radar.

12 Claims, 6 Drawing Sheets

(51) Int. Cl.
  *G06K 9/00*  (2006.01)
  *G06K 9/46*  (2006.01)
  *G06K 9/52*  (2006.01)
  *G06T 7/40*  (2006.01)

(56) References Cited

U.S. PATENT DOCUMENTS

| | | | | |
|---|---|---|---|---|
| 2009/0010540 A1* | 1/2009 | Mullick | ................ | G06T 7/0038 382/170 |
| 2010/0014722 A1* | 1/2010 | Rohrer | ................ | G06K 9/6207 382/128 |
| 2011/0274338 A1* | 11/2011 | Park | .................... | G06K 9/6284 382/133 |
| 2014/0036054 A1* | 2/2014 | Zouridakis | ............ | G06T 7/0012 348/77 |

OTHER PUBLICATIONS

Suri, Sahil, and Peter Reinartz. "Mutual-information-based registration of TerraSAR-X and Ikonos imagery in urban areas." IEEE Transactions on Geoscience and Remote Sensing 48.2 (2010): 939-949.*

Zhang et al., "An Entropy-based Objective Evaluation Method for Image Segmentation," Proceedings of SPIE, vol. 5307, XP 055094582, Dec. 22, 2003, pp. 38-49.

Xie et al., "Mutual Information Based Registration of SAR Images," IEEE, vol. 6, XP010704398, Jul. 21, 2003, pp. 4028-4031.

Rigau et al., "Medical Image Segmentation Based on Mutual Information Maximization," Field Programmable Logic and Application, vol. 3216, XP055093653, Jan. 1, 2004, pp. 135-142.

Zitova et al., "Image registration methods: a survey," Image and Vision Computing, vol. 21, 2003, pp. 977-1000.

Viola et al., "Alignment by Maximization of Mutual Information," International Journal of Computer Vision, vol. 24, No. 2, 1997, pp. 137-154.

Bevington, et al., "Precision aided inertial navigation using SAR and digital map data," IEEE, 1990, pp. 490-496.

International Search Report Issued Jun. 16, 2014 in PCT/EP14/058223 Filed Apr. 23, 2014.

French Search Report Issued Dec. 20, 2013 in Application No. FR1353745 Filed Apr. 24, 2013.

* cited by examiner

REGISTRATION OF SAR IMAGES BY MUTUAL INFORMATION

TECHNICAL FIELD

The present invention generally relates to the field of image registration. It is in particular applicable to the registration of images obtained by Synthetic Aperture Radar (SAR) for an aircraft navigation aid.

STATE OF PRIOR ART

Image registration is a common problem encountered in numerous fields such as medical imaging, robotics, mapping, navigation aid, etc.

Generally, image registration consists in aligning images of a same scene, taken at different times, from different angles of view, from different sensors. A detailed review of the different methods for registering images can be found in the paper of B. Zitova et al. entitled "Image registration methods: a survey" published in Image and Vision Computing, Vol. 21, 2003, pp. 997-1000.

A known method for registering images is focused on the maximization of the mutual information between the image to be registered and a reference image. This method has been described in the context of medical magnetic resonance imaging, in the paper by P. Viola et al. entitled "Alignment by maximization of mutual information", published in Intl Journal of Computer Vision, Vol. 4, N° 2, pp. 137-154.

On the other hand, the aircraft navigation relies conventionally on an on-board inertial navigator, comprised of accelerometers and gyrometers. However, the accuracy achieved by a navigation system is gradually degraded during the flight because of a drift phenomenon. It is therefore necessary to periodically register the inertial navigation system using an absolute navigation system such as a GPS system or an imaging system, for example a Synthetic Aperture Radar (SAR) system. In the latter case, this is called a SAR-aided navigation.

A synthetic aperture radar-aided navigation method is known from the paper of J. E. Bevington et al. entitled "Precision aided inertial navigation using SAR and digital map data", published in Record of the Position Location and Navigation Symposium, 1990, IEEE PLANS' 90, IEEE, 1990, pp. 490-496.

The synthetic aperture radar has the advantage to be capable of being used under any weather and at any time. Using the SAR, images of previously selected ground zones can be formed and compared to reference data, such as a satellite images or field digital models, by means of a registration of images. This comparison enables the geometrical conditions of the shooting to be retrieved, in particular the position and orientation of the aircraft.

A method of mutual information maximization based registration of SAR images has been described in the paper of H. Xie et al. entitled "Mutual information based registration of SAR images" published in Proc. of In Geoscience And Remote Sensing Symposium, IGARSS'03, IEEE International, 2003.

However, this registration method presupposes to store a considerable volume of data and requires to perform a great number of calculations. Consequently, it is poorly adapted to a navigation aid which should operate in real time and not mobilize significant on-board resources in memory and computational power.

A first object of the present invention is consequently to provide a method for registering images which is particularly robust and rapid, and which does not require significant resources in memory and computational power. A subsidiary object of the present invention is to provide a synthetic aperture radar-aided navigation method which uses such a method for registering images.

DISCLOSURE OF THE INVENTION

The present invention is defined by a method for registering an image (I) of an object with respect to a plurality of reference representations ($M_n$) of this object, each reference representation consisting of a set ($Z_n$)) of zones ($Z_n^k$), called homogeneous zones, each homogeneous zone having a homogeneous intensity level, said method being characterized in that:
  for each reference representation of said plurality, the mutual information ($C(I,M_n)$) between said image and the reference representation is calculated, on the set ($Z_n$)) of homogeneous zones of this reference representation;
  the mutual information thus calculated is compared and the reference representation of said plurality for which the mutual information is the highest is selected.

The method according to the invention can then comprise a step of determining the geometrical information for shooting the image (I), which are defined by the geometrical conditions of the shooting of the reference representation selected. Thus, the image (I) is registered, in that the geometrical conditions of its shooting are accurately obtained.

Advantageously, for each reference representation (H), the mutual information is determined by:
  calculating the entropy (H(I)) of the image on the set (Z) of homogeneous zones of the reference representation;
  calculating, for each homogeneous zone ($Z^k$), a weighting factor ($p_k$), associated with said zone, corresponding to the ratio between the area ($\sigma_k$) of this zone and the total area ($\sigma$) of the set of said homogeneous zones;
  calculating, for each homogeneous zone ($Z_k$), the entropy ($H(I^{(k)})$) of the image on this zone;
  calculating the difference between the entropy of the image on the set of said homogeneous zones, on the one hand, and the weighted sum of the entropies of the image on the different homogeneous zones, each zone being weighted by its weighting factor, on the other hand.

According to a first alternative, calculating the entropy (H(I)) of the image on the set (Z) of said homogeneous zones comprises a step of estimating the pixel intensity probability density in the set of said homogeneous zones, by means of a histogram estimation or a core estimation.

According to a second alternative, calculating the entropy ($H(I^{(k)})$) of the image on each homogeneous zone ($Z_k$) comprises a step of estimating the pixel intensity probability density in this homogeneous zone, by means of a histogram estimation or a core estimation.

Said reference representations can have been obtained by a segmentation into homogeneous zones of real images of the object, each real image having been taken by a sensor having a predetermined position and attitude with respect to this object.

Alternatively, said reference representations can have been obtained from a three-dimensional digital model of the object, each reference representation being associated with a position and an attitude of a sensor with respect to this object.

In the latter case, the three-dimensional digital model of the object can comprise homogeneous zones, each homogeneous zone of the digital model being defined by a contour, each contour being defined by a set of points and, optionally, by an interpolation function.

The contour of a homogeneous zone can be defined by a polygon passing through the points of said set of points.

The invention also relates to a synthetic aperture radar aircraft navigation aid method, according to which said radar obtains at least one image (I) of the zone overflown by said aircraft. Said image is then registered with respect to a plurality of reference representations of the overflown zone, using the method for registering an image previously defined, each reference representation being associated with a position and an attitude of said aircraft in a geo-referenced frame, and navigation information of the aircraft is deduced from the position and attitude associated with the reference representation for which the mutual information is the highest.

The reference representations can be obtained from a Field Digital Model (FDM) stored in a database on-board said aircraft, said field digital model comprising a plurality of homogeneous zones ($\tilde{Z}^k$), each homogeneous zone of the field digital model ($\tilde{Z}^k$) being defined by a contour, each contour being itself defined by a set of points ($\tilde{P}_{\tilde{Z}_k}^j$) of coordinates stored in the database and, optionally, by an interpolation function.

The homogeneous zones of the field digital model can be classified by types, one type being associated with each of these zones and stored in relation with it in the data base.

According to an exemplary embodiment, for at least one reference representation ($M_n$), the homogeneous zones ($Z_n^k$) of this reference representation are obtained using a geometrical transformation ($T_n$) of the homogeneous zones of the field digital model, said geometrical transformation depending on a position and an attitude of the aircraft.

BRIEF DESCRIPTION OF THE DRAWINGS

Further characteristics and advantages of the invention will appear upon reading preferential embodiments of the invention made in reference to the appended figures from which.

DETAILED DISCLOSURE OF PARTICULAR EMBODIMENTS

The idea underlying the invention is to perform an image registration based on a mutual information maximization criterion, the mutual information being calculated on homogeneous zones of reference images (called reference representations hereinafter).

Figure 1:
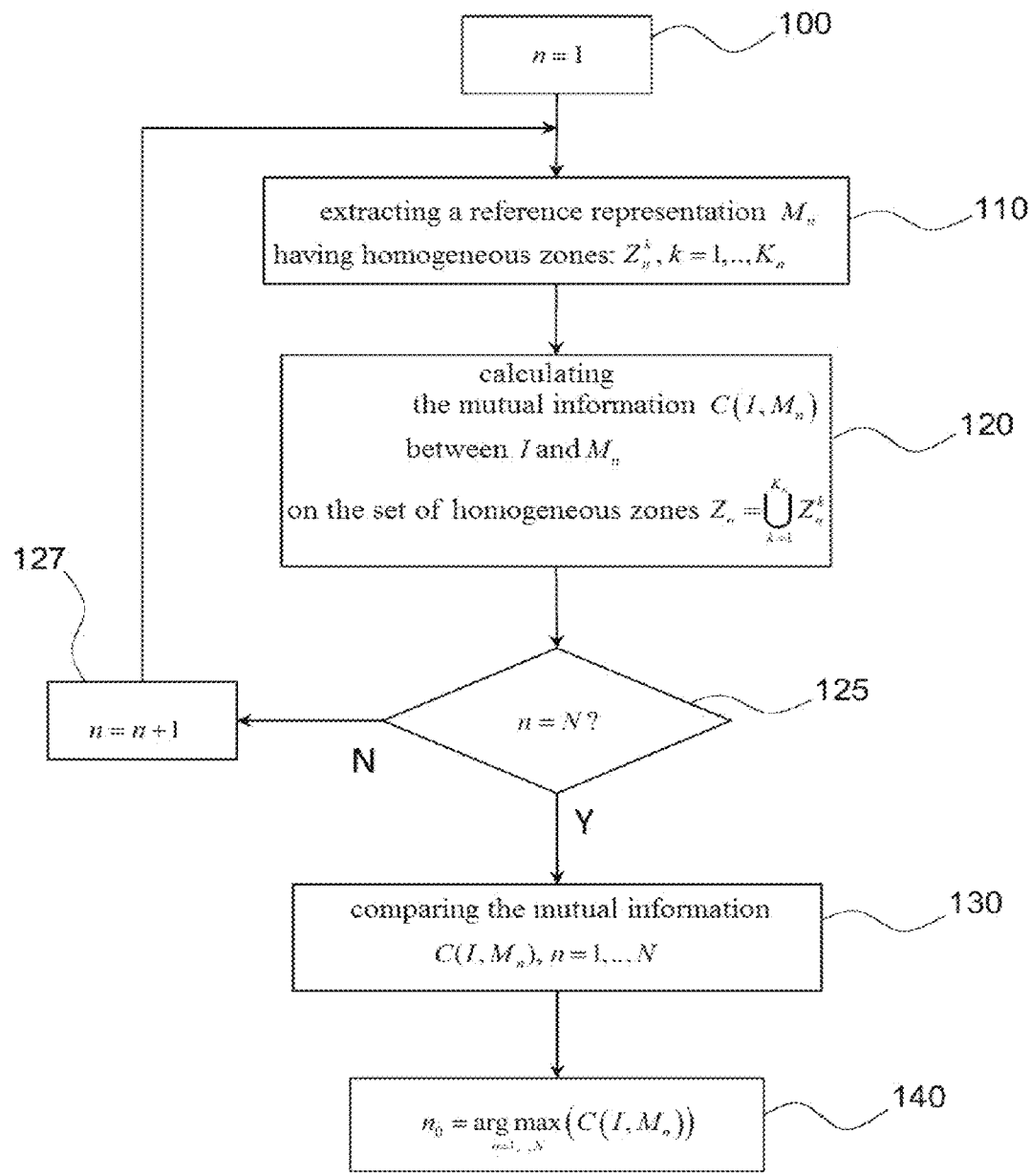
FIG. 1 schematically represents the flowchart of a method for registering an image according to one embodiment of the invention.

FIG. 1 schematically represents an image registration method according to one embodiment of the invention.

It is assumed here that an image of an object (in general three-dimensional), noted I, has been obtained (the term object being herein intended in its broadest sense and can correspond to a scene) using a sensor, for example a synthetic aperture radar. The position and attitude of the sensor with the respect to the object are not known.

It is supposed that there are on the other hand a plurality of reference representations of this object, noted $M_n$, n=1, ..., N. By a reference representation of this object, it is intended a representation of this object, viewed from an observation point and under a reference attitude. The representation of the object consists of a plurality of homogeneous zones, each zone being associated with an intensity level (grey level, luminance level). The reference observation point can be defined by its relative coordinates with respect to the object in question. The reference attitude can generally be defined by a triplet of angles giving the orientation of the sensor under which the object is observed. The reference representations can be considered as simplified images of the object with a description per homogeneous zone.

According to a first alternative, the reference representations are obtained from real images of the object taken using a sensor under well-defined shooting conditions, in other words for a predetermined position and attitude of the sensor. The sensor that was used to take the image I can be different from the one that was used to obtain the reference representation. For example, the sensor that was used to obtain the reference representation can be an optical sensor and the sensor that was used to obtain the image to be registered can be a synthetic aperture radar. Preferably, however, both sensors are chosen identical. The aforesaid real images are processed by means of a segmentation operation, known per se, in order to obtain representations into homogeneous zones with the above-defined meaning. A description of a method of segmentation into homogeneous zones can in particular be found in the paper of Rigau J. et al. entitled "Medical image segmentation based on mutual information maximization" published in Medical Image Computing and Computer-Assisted Intervention—MICCAI 2004 (pp. 135-142). The segmentation of the real image may not be exhaustive but in this case, only the part of the image segmented into homogeneous zones will be selected in the reference representation.

According to a second alternative, the reference representations of the object are obtained by a computer from a digital model of the object. This digital model can be defined by meshing the surface of the object, each mesh being characterized by a reflectivity coefficient.

Other alternatives for obtaining reference representations of the object can be contemplated without departing from the scope of the present invention.

The image registration method aims at determining from the plurality of reference representations $M_n$, n=1, ..., N which one best corresponds to the image I. It can be thus sequentially executed, by iteration on the index n, or in parallel. The sequential search mode has been represented here.

In a first step, 100, the index n of the reference representation is initialized.

In step 110, the reference representation, $M_n$ is recovered, for example by reading a mass storage. This consists of a plurality K of homogeneous zones, $Z_n^k$, k=1, ..., $K_n$. By homogeneous zone, it is intended a zone in which the intensity is constant. Each homogeneous zone $Z_n^k$ is generally constituted of a plurality of related components. These related components are advantageously chosen having simple shapes, for example polygonal shapes. In this case, each homogeneous zone can be stored in memory as a vector form.

In step 120, the average mutual information between the image I and the reference representation M is calculated, on the set of homogeneous zones $Z_n^k$, k=1, ..., $K_n$. More precisely, if $$Z_n = \bigcup_{k=1}^{K_n} Z_n^k$$

denotes the set of homogeneous zones of the reference representation $M_n$, the mutual information $C(I,M_n)$ between the image I and the reference representation $M_n$ is calculated on the set of homogeneous zones $Z_n$. Equivalently, the mutual information $C(I,M_n)$ is that between the image I restricted to $Z_n$, noted $I[Z_n]$, and the reference representation $M_n$. By the restriction of the image I to the zone $Z_n$, it is intended the image defined by:

$$I[Z_n] = \{i(x,y)\phi_n(x,y) | i(x,y) \in I\} \quad (1)$$

where $\phi_n(x,y)$ is the indicator function of $Z_n$.

Steps 110 and 120 are executed by iteration on the N reference representations, as indicated by steps 125 and 127.

In step 130, the mutual information calculated in step 120 are compared for the different reference representations.

In step 140, the reference representation maximizing the mutual information $C(I,M_n)$ is selected, in other words the reference representation having the index $n_o$ such that:

$$n_0 = \arg\max_{n=1,...,N}(C(I, M_n)) \quad (2)$$

It is reminded that the mutual information $C(X,Y)$ between two random variables X,Y is defined by:

$$C(X,Y) = H(X) - H(X/Y) = H(Y) - H(Y/X) \quad (3)$$

where H(X) (resp. H(Y)) designates the entropy of X (respectively of Y) and H(X/Y) (respectively H(Y/X)) designates the conditional entropy of the random variable X with respect to Y (respectively the conditional entropy of the random variable Y with respect to X).

The mutual information is equivalently expressed, in a symmetrical form, by:

$$C(X,Y) = H(X) + H(Y) - H(X,Y) \quad (4)$$

where H(X,Y) is the joint entropy of the variables X and Y.

The calculation of the mutual information $C(I,M_n)$ between the image I and the reference representation $M_n$ on the set $Z_n$ of the homogeneous zones of $M_n$ is detailed hereinafter. For the sake of simplifying the notations, the index n will be omitted hereinafter from the reference representation. Therefore, M will denote the reference representation and Z the set of homogeneous zones of M.

This calculation consists in "probabilizing" the image I as well as the representation M, that is considering that the intensity i of a point (or pixel) of I and the intensity m of a point (or pixel) of Z as random variables.

The entropy of the representation M is obtained by:

$$H(M) = -\int p(m=u)\log(p(m=u))du \quad (5)$$

Given than Z consists of homogeneous zones $Z^k$, k=1, ..., K, if $p_k = p(m=m_k)$ where $m_k$ is the intensity of the points in the homogeneous zone $Z^k$, the entropy of the representation M can be expressed as $$H(M) = -\sum_{k=1}^{K} p_k \log(p_k) \quad (6)$$

In a similar way, the entropy of the image I on the zone Z is no other than:

$$H(I) = -\int p(i=v)\log(p(i=v))dv \quad (7)$$

where the integration is performed from the histogram of the pixel intensity on the zone Z. Alternatively, the probability density p(v)=p(i=v) can be obtained thanks to a core estimation, from a sampling of the pixel intensity of I in the zone Z, in a manner known per se.

Finally, the joint entropy of the images I and M in the zone Z is defined by:

$$H(I,M) = -\int p(m=u,i=v)\log(p(m=u,i=v))dudv \quad (8)$$

If $i^{(k)}$ denotes the random variable i conditioned by $m=m_k$, where $m_k$ is the pixel intensity of the image M in the zone $Z^k$, the joint entropy is the sum of contributions on the different homogeneous zones:

$$H(I, M) = -\sum_{k=1}^{K} p_k \int p(i^{(k)} = v)\log(p_k p(i^{(k)} = v))dv \quad (9)$$

and consequently:

$$H(I, M) = \sum_{k=1}^{K} p_k H(I^{(k)}) - \sum_{k=1}^{K} p_k \log p_k \quad (10)$$

by setting $H(I^{(k)}) = \int p(i^{(k)}=v)\log(p(i^{(k)}=v))dv$ which is no other than the entropy of the image I in the zone $Z^k$, or equivalently the entropy of the image I restricted to the zone $Z^k$, noted $I[Z^k]$.

The expressions (4), (6) and (10) result in the mutual information C(I,M) between the image I and the reference representation M, on the zone Z, being given by:

$$C(I, M) = H(I) - \sum_{k=1}^{K} p_k H(I^{(k)}) \quad (11)$$

It will be noted that, according to (3), the second term of the expression (11) can be considered as the conditional entropy of the random variable i with respect to m, noted H(I/M).

Figure 2:
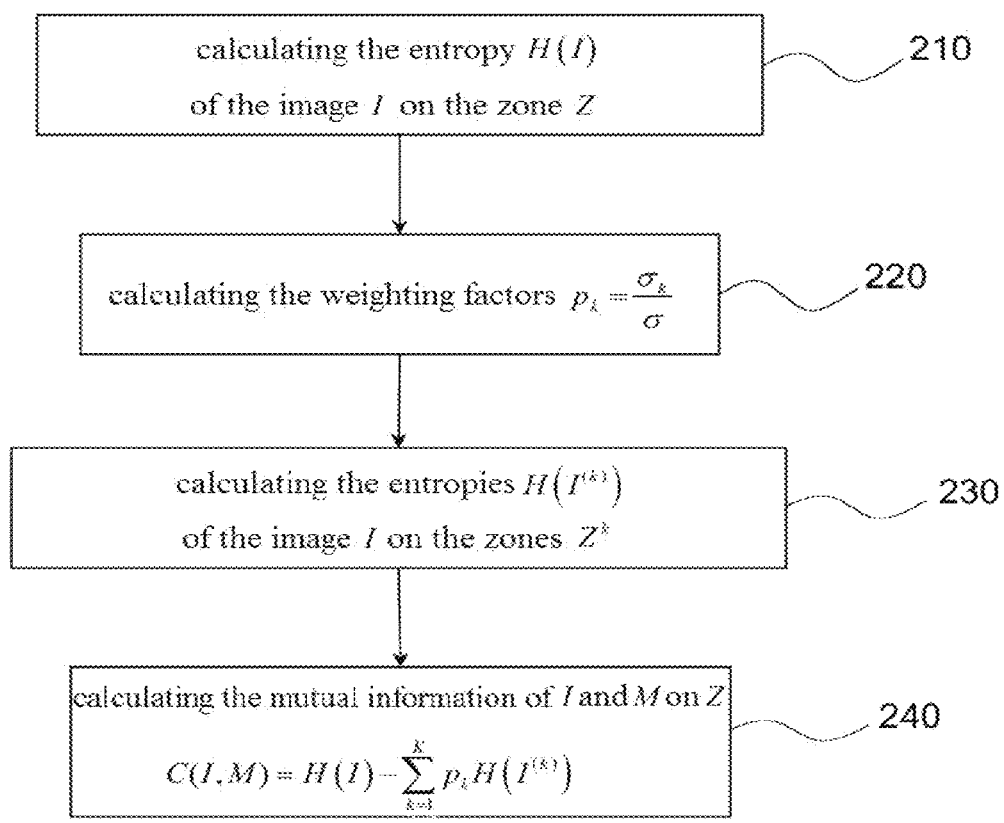
FIG. 2 schematically illustrates a processing step of the registration method of FIG. 1.

FIG. 2 schematically represents the method of calculating the mutual information between a sensed image I and a reference representation, as used in step 120 of FIG. 1.

In a first step, 210, the entropy H(I) of the image I is calculated on the zone Z, that is on the set of homogeneous zones $Z^k$ of M, from the expression (7).

In a second step, 220, for each homogeneous zone $Z^k$ of the reference representation, the probability $p_k$ that a point of Z belongs to $Z^k$ is determined. As previously indicated, this probability acts as a weighting factor of the conditional entropies $H(I^{(k)})$ in calculating the mutual information C(I, M).

The probability $p_k$ is obtained by $$p_k = \frac{\sigma_k}{\sigma} \text{ where } \sigma = \sum_{k=1}^{K} \sigma_k$$

where $\sigma_k$ is the area of the homogeneous zone $Z^k$ and $\sigma$ is the area of Z, that is the total area of the set of homogeneous zones considered. Indeed, given that only the zone Z is considered, the probability that a point (or pixel) is of the intensity $m_k$ is simply the probability that this point or pixel belongs to the homogeneous zone $Z^k$.

In a third step 230, for each homogeneous zone $Z^k$, k=1, . . . , K of Z, the entropy of the image I in the zone is calculated, that is the entropy of $I^{(k)}$ with the previously defined meaning:

$$H(I^{(k)}) = -\int p(i^{(k)}=v) \log(p(i^{(k)}=v)) dv \quad (12)$$

This integration is performed by estimating the probability density p(v) from the histogram of the pixel intensity of I in the zone $Z^k$ or, by means of a core estimation, from a sampling of the intensity in this zone. The integration can be digitally performed from the trapezoid room or the Simpson method, in a manner known per se.

In step 240, the mutual information between the sensed image I and the reference representation M on the zone Z is obtained, from the expression (11). More precisely, the difference between the entropy of the image I on the zone Z (obtained in 210), and the weighted sum of the entropies of I calculated on the different homogeneous zones of M (obtained in 230) is calculated, each zone $Z^k$ being weighted by its associated weighting factor, $p_k$ (obtained in 220).

Figure 3A:
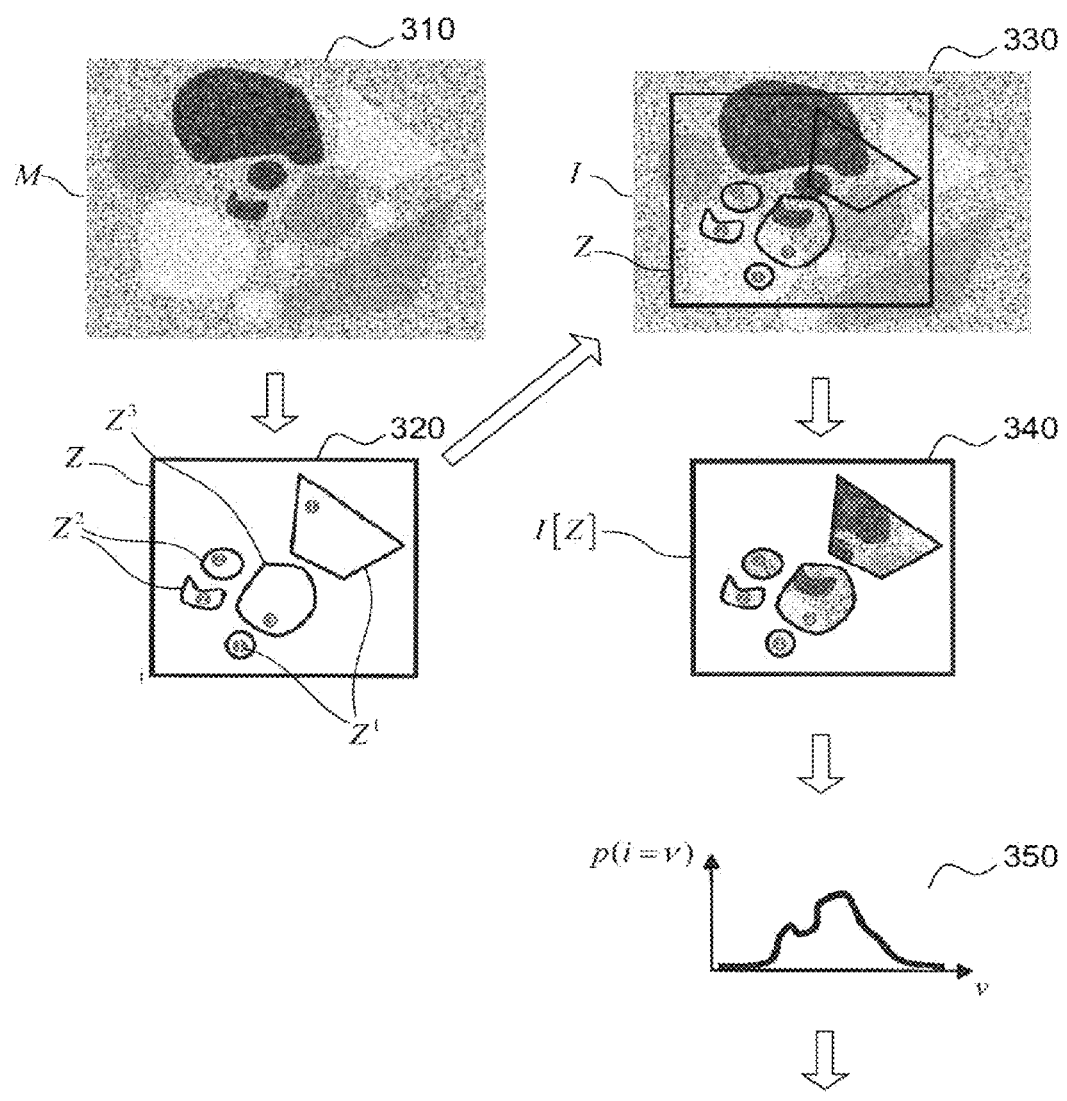
FIGS. 3A and 3B illustrate using an example the calculation of the mutual information between a sensed image and a reference representation.
Figure 3B:
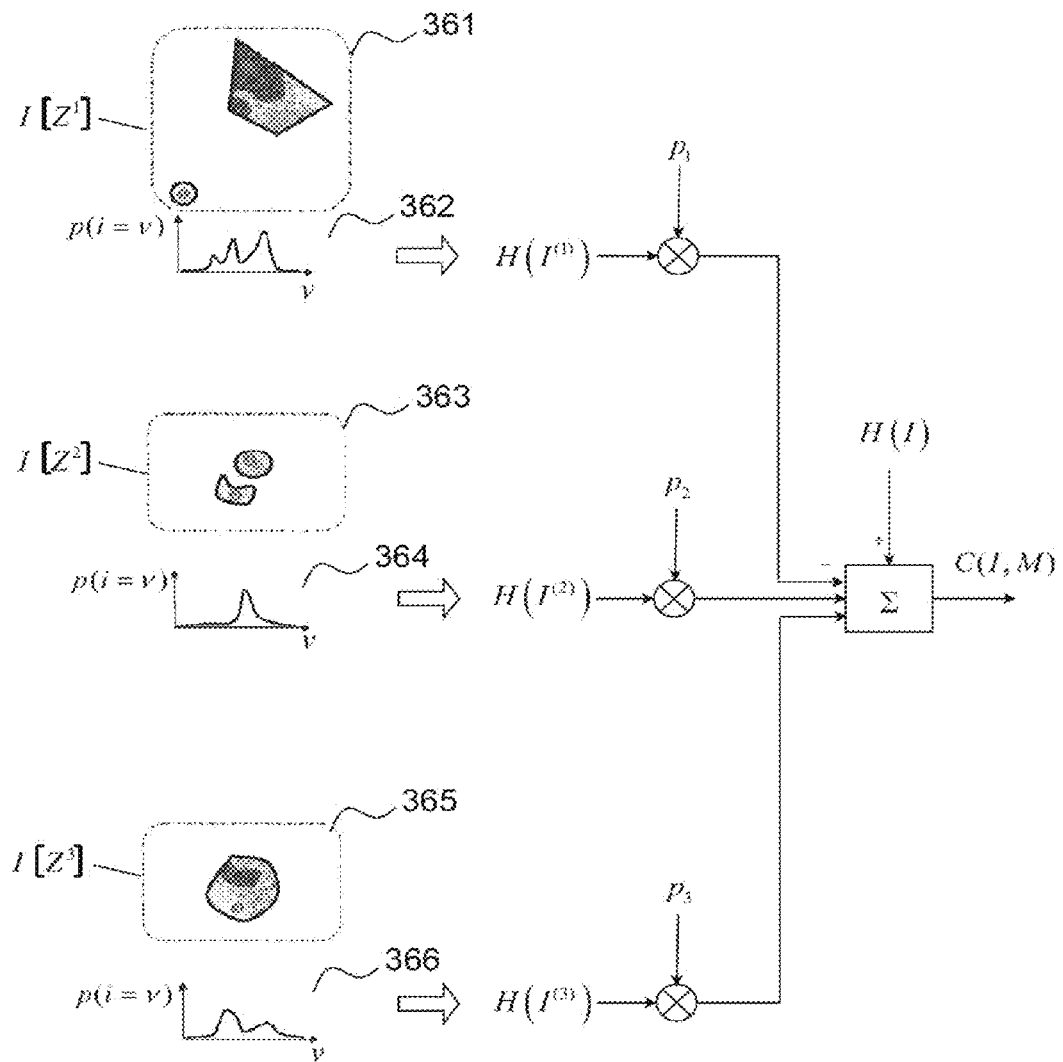

FIGS. 3A and 3B illustrate, using an example, the calculation of the mutual information between a sensed image I and a reference representation M on the zone Z.

A reference representation M of an object has been designated as 310. This representation includes homogeneous zones $Z^1$, $Z^2$, $Z^3$. It is noticed that $Z^1$ and $Z^2$ each consist of two related components. The union of the homogeneous zones selected makes up the zone Z designated as 320.

In the present case, the image I represented in 330 is a single translate of the reference representation M, but in the general case, can of course be substantially more complex. The zone Z and the image I have been shown superimposed with each other.

In 340 is represented the image I restricted to the zone Z, previously noted I[Z]. By means of this restricted image, the probability density p(v) can be estimated in Z, from the histogram of the pixel intensity of I in the zone Z. Alternatively, this density can be estimated from a sampling of the intensity of I in this zone.

In 361, 363 and 365, is represented the image I restricted to the zones $Z^1$, $Z^2$, $Z^3$ respectively, that is the images $I[Z^1]$, $I[Z^2]$, $I[Z^3]$. From the histograms 362, 364, 366 of the intensity in these zones, or from a sampling of the intensity of these pixels in these zones (Parzen method), the probability density p(v) is estimated in each of these zones. The entropies II ($I^{(k)}$) is deduced therefrom from the expression (12). These entropies are then weighted by the relative areas of these zones $p_k$ and the weighted sum thus obtained is subtracted from the entropy H(I) of the image I in the zone Z, to give the mutual information C(I,M).

The image registration method previously described can advantageously be applicable to a SAR navigation aid method.

Figure 4:
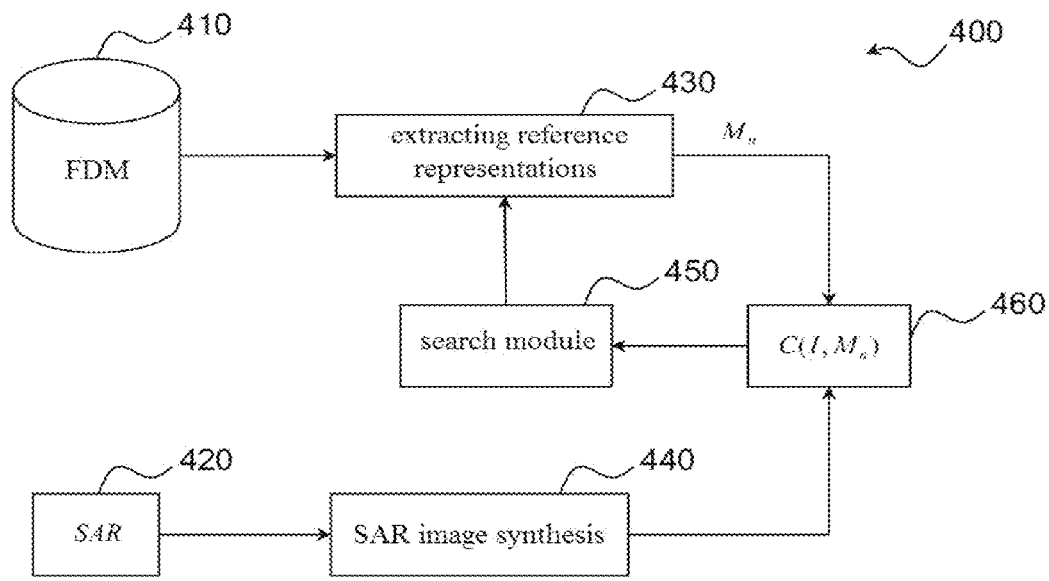
FIG. 4 schematically represents a first SAR navigation aid system using the image registration method according to the invention.

FIG. 4 schematically represents a first navigation aid system using a registration method according to the invention.

The navigation aid system 400 is on-board an aircraft. It comprises a synthetic aperture radar 420 and a signal processing module, connected to the radar 420, making an image synthesis SAR, 440. The synthetic aperture radar enables images of the zone overflown by the aircraft to be obtained.

The system 400 further comprises an on-board database 410 in which a three-dimensional field digital model or FDM is stored. This model describes the field as homogeneous zones. These homogeneous zones can be for example plots, lakes, routes, roofs, etc.

Each homogeneous zone $\tilde{Z}^k$ of the model is defined by a succession of points and optionally an interpolation curve, such as a spline function. Each point is defined by its coordinates in a geo-referenced frame, for example by its latitude, longitude, and altitude.

Figure 5:
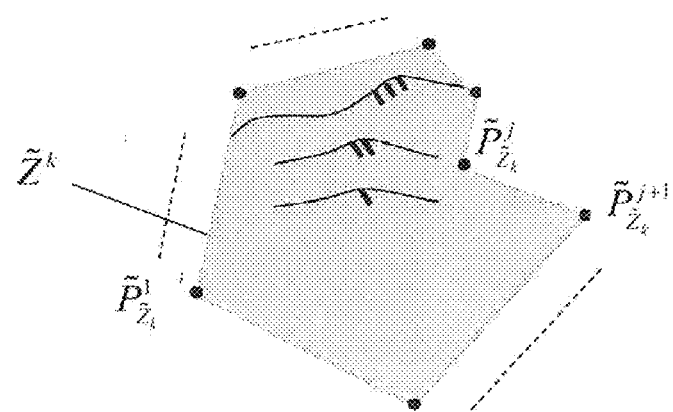
FIG. 5 schematically represents a homogeneous zone of the field digital model used in the system of FIG. 4.

FIG. 5 schematically represents a homogeneous zone $\tilde{Z}^k$, defined by a plurality of points $\tilde{P}_{\tilde{Z}_k}^j$ of the coordinates ($\text{long}\tilde{P}_{\tilde{Z}_k}^j$, $\text{lat}\tilde{P}_{\tilde{Z}_k}^j$, $\text{alt}\tilde{P}_{\tilde{Z}_k}^j$) where $\text{long}\tilde{P}_{\tilde{Z}_k}^j$, $\text{lat}\tilde{P}_{\tilde{Z}_k}^j$, and $\text{alt}\tilde{P}_{\tilde{Z}_k}^j$ are respectively the longitude, latitude, and altitude of the point $\tilde{P}_{\tilde{Z}_k}^j$. In the present case, no interpolation curve is defined and the homogeneous zone $\tilde{Z}^k$ is no other than that bounded by the polygon (not necessarily included in a plane) passing through the points $\tilde{P}_{\tilde{Z}_k}^j$.

With each homogeneous zone $\tilde{Z}^k$ is associated a type $\tilde{m}_k$, k=1, . . . , K. The type $\tilde{m}_k$ is connected to the radar reflectivity of the zone, itself depending on the nature of the zone in question (vegetation type, deep water, asphalt road, etc.).

The FDM model can be obtained by segmentation and prior classification of maps and/or aerial and/or satellite images. It will be noted that this model simply aims at identifying homogeneous zones at the terrestrial surface (this identification being on the other hand not necessarily exhaustive). It is in particular not necessary to identify of the nature of each zone, only its homogeneous nature over time being important after all. For example, a vegetation zone of some type will keep a homogeneous radar reflectivity despite season variations.

Thus, it will be understood that the FDM model is considerably less memory intensive than conventional aerial images. Accordingly, it is well suited to an on-board use.

Back to FIG. 4, the search module 450 provides sequentially or in parallel, to the extraction module 430, a plurality of possible positions and attitudes of the aircraft, themselves defining positions and attitudes of the synthetic aperture radar.

For each couple-attitude of the SAR position, the extraction module 430 obtains a reference representation $M_n$ of the field by a geometrical transformation $T_n$ of the FDM model. This transformation $T_n$ gives a view of the FDM model from the observation point and under the angle which are given by the position-attitude couple in question.

The transformation $T_n$ is generally comprised of translations, rotations, projection, etc. A homogeneous zone $\tilde{Z}^k$ of the FDM model, defined by the coordinates of its points $\tilde{P}_{\tilde{Z}_k}^j$ is thus transformed into a homogeneous two-dimensional zone, noted $Z_n^k = T_n(\tilde{Z}_k)$, bounded by the points $P_{\tilde{Z}_k}^j = T(\tilde{P}_{\tilde{Z}_k}^j)$.

Of course, the transformation $T_n$ leaves invariant the type $\tilde{m}_k$ of the zone. In other words, the zone $Z_n^k$ is of the type $m_k = \tilde{m}_k$, regardless of the transformation $T_n$.

The image registration module 460 calculates the mutual information $C(I, M_n)$ between the sensed image I, as synthesized by the module 440, and each reference representation, $M_n$, extracted from the FDM base. Then, it selects the reference representation $M_{n_0}$ closest to I by maximizing $C(I, M_n)$. The search module modifies by successive iterations the position and attitude of the aircraft so as to find the maximum of the mutual information $C(I, M_n)$.

According to a first alternative, a local maximum, that is a maximum obtained on a discrete range of possible positions and attitude of the aircraft, could be enough.

According to a second alternative, the maximum will be considered as reached as soon as the mutual information is higher than a predetermined threshold.

It will be noticed that the maximum of the mutual information C(I,M) is reached for a perfect match between I and M, in which case $$C(I, M) = H(M) = -\sum_{k=1}^{K} p_k \log p_k.$$

It will be noted that this value is positive since $p_k < 1$. The search for the closest reference representation can cease as soon as a reference representation M will be found, such that:

$$K \geq K_{\min} \text{ and } \frac{C(I, M) + \sum_{k=1}^{K} p_k \log p_k}{\sum_{k=1}^{K} p_k \log p_k} \leq \varepsilon \quad (13)$$

where $K_{min}$ and $\varepsilon$ are predetermined threshold values. The first condition of (13) aims at discarding the reference representations lacking homogeneous zones and having for that reason an insufficient entropy.

Whatever the alternative, when the search module 450 has found a reference representation $M_{opt}$ maximizing the mutual information, the position, and attitude of the aircraft (or the sensor) are those of the transformation $T_n$ associated with $M_{opt}$.

It has been assumed in this embodiment that each new reference representation $M_n$ requires to perform a geometrical transformation $T_n$ on the FDM model. According to one alternative, to speed up the search, it will be enough to perform a simple geometrical operation on an already extracted representation (translation, rotation and more generally an isometric transformation) without involving the FDM model each time. Advantageously, this alternative can combine a quick search loop simply involving isometric operations on a reference representation, and a slow search loop requiring more complex geometrical transformations (new projection for example).

Figure 6:
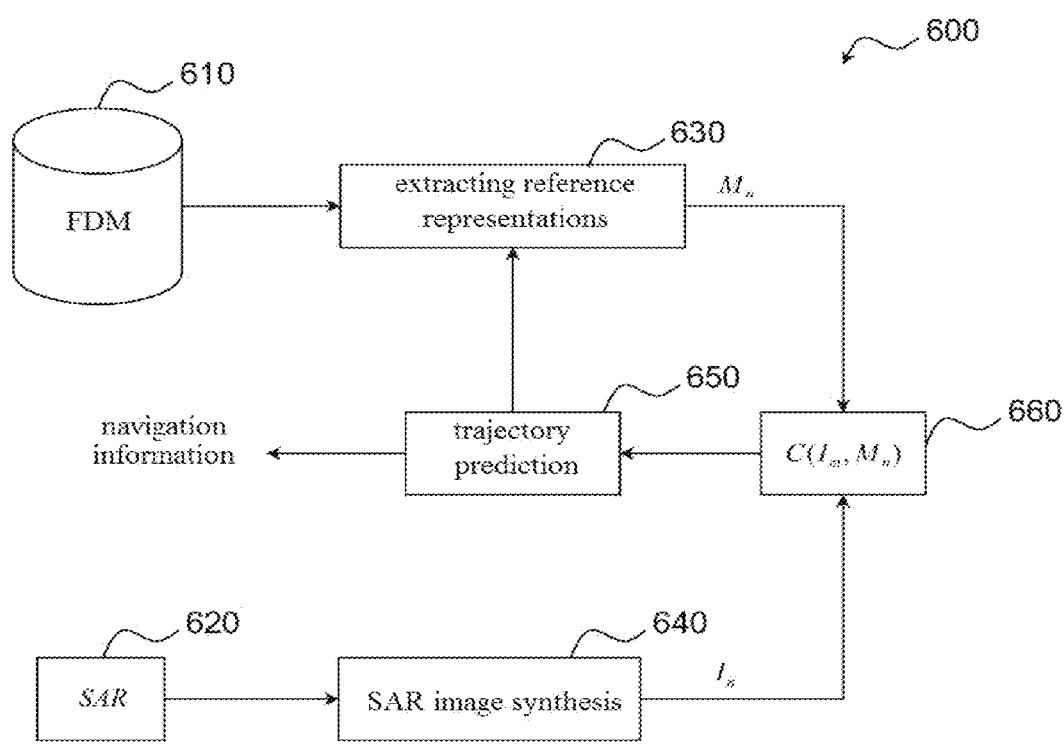
FIG. 6 schematically represents a second SAR navigation aid system using the image registration method according to the invention.

FIG. 6 schematically represents a second SAR navigation aid system using the image registration method according to the invention.

This system 600, comprises, as that of FIG. 4, a synthetic aperture radar 620, an image synthesis module 640, an on-board database 610 in which are stored a FDM field digital model, as well as a reference representation extraction module 630. The elements 610, 620, 630, 640 are identical to the elements 410, 420, 430, 440 of FIG. 4 and their description will thus not be repeated here.

Unlike the system of FIG. 4, the synthetic aperture radar 620 and the image synthesis module 630 generate SAR images, $I_m$, at regular intervals. Further, the system 600 comprises a trajectory prediction module 650. This module receives for each image $I_m$, the index of the reference representation, $M_{m,n}$, which is closest thereto and deduces therefrom a navigation information (position, speed, direction, and attitude of the aircraft). Depending on the speed and direction of the aircraft, the trajectory prediction module can determine a position zone and an attitude angular range where the aircraft will be able to be at the next instant, and deduce therefrom the reference representations $M_{m+1,n}$ which will be taken into consideration in the similarity calculation. Optionally, the module 660 also provides the values $C(I_m, M_{m,n})$ to the prediction module 650, such that it can refine its prediction, for example according to a steepest gradient optimization algorithm. Other optimization or sequential estimation algorithms (such as Kalman filtering) can be implemented without departing from the scope of the present invention.

The invention claimed is:

1. A method for registering an image of an object with respect to a plurality of reference representations of the object, each reference representation being of a set of homogeneous zones, each homogeneous zone having a homogeneous intensity level, the method comprising:

calculating, for each reference representation of the plurality, mutual information between the image and the reference representation, on the set of homogeneous zones of the reference representation;

comparing the mutual information thus calculated and selected the reference representation of the plurality for which the mutual information is highest.

2. The method for registering an image according to claim 1, wherein, for each reference representation, the mutual information is determined by:

calculating entropy of the image on the set of homogeneous zones of the reference representation;

calculating, for each homogeneous zone, a weighting factor, associated with the zone, corresponding to the ratio between the area of the zone and total area of the set of the homogeneous zones;

calculating, for each homogeneous zone, the entropy of the image on the zone;

calculating the difference between the entropy of the image on the set of the homogeneous zones and the weighted sum of the entropies of the image on the different homogeneous zones, each zone being weighted by its weighting factor.

3. The method for registering an image according to claim 2, wherein the calculating the entropy of the image on the set of the homogeneous zones comprises estimating pixel intensity probability density in the set of the homogeneous zones, by a histogram estimation or a core estimation.

4. The method for registering an image according to claim 2, wherein the calculating the entropy of the image on each homogeneous zone comprises estimating pixel intensity probability density in the homogeneous zone, by a histogram estimation or a core estimation.

5. The method for registering an image according to claim 1, wherein the reference representations are obtained by a segmentation into homogeneous zones of real images of the object, each real image having been taken by a sensor having predetermined position and attitude with respect to the object.

6. The method for registering an image according to claim 1, wherein the reference representations are obtained from a three-dimensional digital model of the object, each reference representation being associated with a position and an attitude of the sensor with respect to the object.

7. The method for registering an image according to claim 6, wherein the three-dimensional digital model of the object comprises homogeneous zones, each homogeneous zone of the digital model being defined by a contour, each contour being defined by a set of points and, optionally, by an interpolation function.

8. The method for registering an image according to claim 7, wherein the contour of a homogeneous zone is defined by a polygon passing through the points of the set of points.

9. A synthetic aperture radar-aided aircraft navigation method, comprising:
    obtaining at least one image of a zone overflown by the aircraft; and
    registering the image with respect to a plurality of reference representations of the overflown zone, using the method for registering an image according to claim 1, each reference representation being associated with a position and an attitude of the aircraft in a geo-referenced frame, and
    wherein aircraft navigation information is deduced from position and attitude associated with the reference representation for which the mutual information is the highest.

10. The aided navigation method according to claim 9, wherein the reference representations are obtained from a Field Digital Model stored in a database on-board the aircraft, the field digital model comprising a plurality of homogeneous zones, each homogeneous zone of the field digital model being defined by a contour, each contour being itself defined by a set of points of coordinates stored in the database and, optionally, by an interpolation function.

11. The aided navigation method according to claim 10, wherein the homogeneous zones of the field digital model are classified by types, one type being associated with each of the zones and stored in relation with it in the database.

12. The aided navigation method according to claim 11, wherein, for at least one reference representation, the homogeneous zones of the reference representation are obtained using a geometrical transformation of the homogeneous zones of the field digital model, the geometrical transformation depending on a position and an attitude of the aircraft.

* * * * *